(12) United States Patent
Ogawa et al.

(10) Patent No.: US 7,460,299 B2
(45) Date of Patent: Dec. 2, 2008

(54) REAR PROJECTION DISPLAY APPARATUS AND TRANSMISSION TYPE SCREEN

(75) Inventors: Yasufumi Ogawa, Chiba (JP); Takaaki Iwaki, Tokyo (JP); Yoshihiro Hagiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/714,099

(22) Filed: Mar. 6, 2007

(65) Prior Publication Data
US 2007/0211222 A1 Sep. 13, 2007

(30) Foreign Application Priority Data
Mar. 9, 2006 (JP) ............. 2006-064936

(51) Int. Cl.
*G03B 21/56* (2006.01)
(52) U.S. Cl. .................. 359/443; 359/460
(58) Field of Classification Search ......... 359/443, 359/455–456, 460, 450
See application file for complete search history.

(56) References Cited

U.S. PATENT DOCUMENTS

| 2,187,904 | A | * | 1/1940 | Hurley | ............ 359/450 |
|---|---|---|---|---|---|
| 2,315,721 | A | | 4/1943 | Martin | |
| 2,372,173 | A | | 3/1945 | Bodde, Jr. | |
| 2,379,499 | A | | 7/1945 | Smith | |
| 3,655,203 | A | * | 4/1972 | Gretzky | ............ 273/358 |
| 5,200,854 | A | * | 4/1993 | Ogino et al. | ............ 359/460 |
| 2005/0146687 | A1 | | 7/2005 | Gohman et al. | |

FOREIGN PATENT DOCUMENTS

| GB | 519632 | 4/1940 |
|---|---|---|
| JP | 01-302338 | 12/1989 |
| JP | 03-282442 | 12/1991 |
| JP | 7-92565 | 4/1995 |
| JP | 10-048750 | 2/1998 |
| JP | 2004-053638 | 2/2004 |

* cited by examiner

*Primary Examiner*—Christopher Mahoney
(74) *Attorney, Agent, or Firm*—Finnegan, Henderson, Farabow, Garrett & Dunner, L.L.P.

(57) ABSTRACT

In a rear projection display apparatus including a transmission type screen installed on the front face of an apparatus main body, and a video projector disposed inside the apparatus main body and projecting video on the transmission type screen from the rear side thereof, the transmission type screen includes a lens sheet and is configured such that a plurality of pull portions provided along horizontal and longitudinal sides of the lens sheet are pulled upward and downward, and leftward and rightward, respectively, by a pulling device provided to extend along the circumference of the lens sheet.

12 Claims, 8 Drawing Sheets

FIG. 7
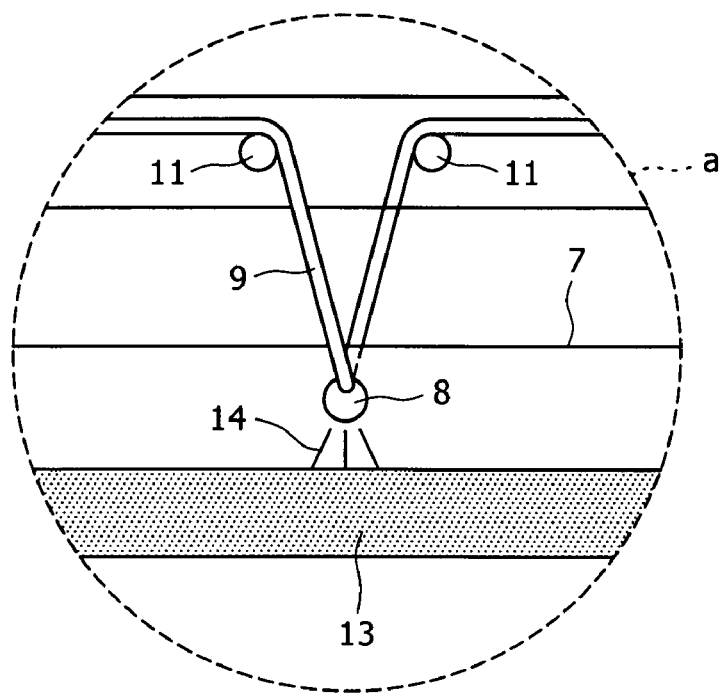
FIG. 8A  FIG. 8B  FIG. 8C
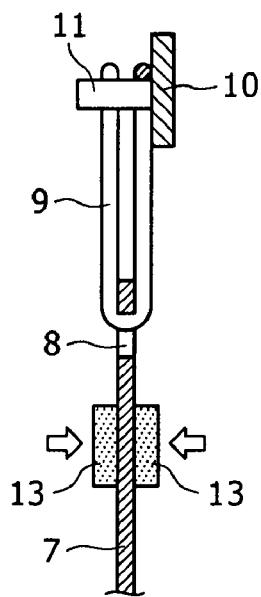 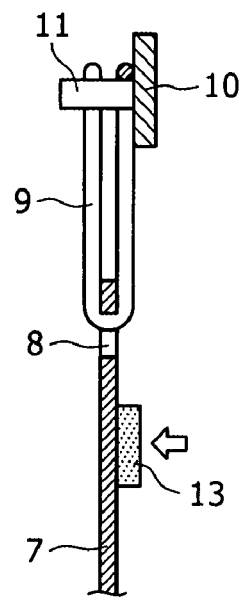 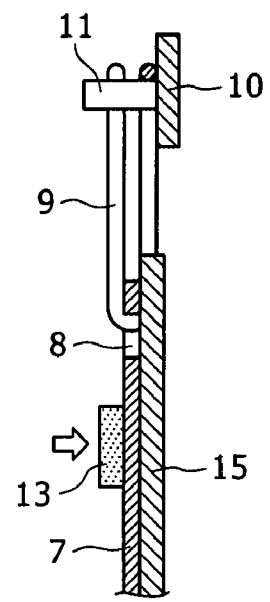

REAR PROJECTION DISPLAY APPARATUS AND TRANSMISSION TYPE SCREEN

CROSS REFERENCES TO RELATED APPLICATIONS

The present invention contains subject matter related Japanese Patent Application JP 2006-064936 filed in the Japanese Patent Office on Mar. 9, 2006, the entire contents of which being incorporated herein by reference.

BACKGROUND OF THE INVENTION

1. Field of the Invention

The present invention relates to a rear projection display apparatus which projects and displays video on a transmission type screen from the rear side thereof and a transmission type screen used in the rear projection display apparatus.

2. Description of the Related Art

In general, a rear projection display apparatus is configured to project and display video on a transmission type screen installed on the front face of the apparatus main body from a video projector installed on the rear side of the transmission type screen. The transmission type screen used in the rear projection display apparatus uses a lens sheet such as a lenticular lens sheet or a Fresnel lens sheet in order to obtain desired image display performance.

Such a lens sheet needs a device to maintain a predetermined planar shape since the lens sheet itself has low rigidity. In the past, the planar shape has been maintained by bonding the lens sheet to a resin molding plate or glass plate which is a rigid body.

However, because of using the resin molding or glass plate, this configuration increases the weight of the entire screen, which produces the following disadvantages: A frame retaining the screen may need increased rigidity, which tends to increase the cost of material and which increases the thickness of the frame to thereby impose restrictions on the design of the screen.

To eliminate such disadvantages, a screen configured as disclosed in e.g. Japanese Patent Laid-open No. Hei 7-92565 (Patent Document 1) has been proposed as a transmission type screen that can maintain the planar shape of a lens sheet without use of a resin molding plate or glass plate. More specifically, the screen described in Patent Document 1 is characterized by including ribs fixedly attached to at least one side of a lens sheet, brackets fixedly attached to frames disposed on the circumferential edge of the lens sheet, and an elastic body having a restoring force acting between the rib and the bracket so as to be separate from each other, and in that the lens sheet is stretched and supported by the action of the elastic body.

SUMMARY OF THE INVENTION

However, the screen described in Patent Document 1 cannot respond to expansion and contraction or deformation of the lens sheet due to the secular variation or environmental changes since the lens sheet is configured to be pulled in one direction. As a result, the lens sheet produces wrinkles or sag, which causes deterioration in image quality such as distortion of an image or the degradation of focus.

Thus, it is desirable to provide a transmission type screen that can reliably suppress the occurrence of wrinkles or sag in a lens sheet, thereby surely preventing deterioration in image quality.

According to an embodiment of the present invention there is provided a rear projection display apparatus including, a transmission type screen installed on the front face of an apparatus main body, and a video projector disposed inside the apparatus main body and projecting video on the transmission type screen from the rear side thereof, wherein the transmission type screen includes a lens sheet and is configured such that a plurality of pull portions provided along horizontal and longitudinal sides of the lens sheet are pulled upward and downward, and leftward and rightward, respectively, by a pulling device provided to extend along the circumference of the lens sheet.

According to an embodiment of the present invention there is provided a transmission type screen installed on the front face of a rear projection display apparatus, including a lens sheet, According to the embodiment of the present invention, the plurality of pull portions provided along horizontal and longitudinal sides of the lens sheet are pulled upward and downward, and leftward and rightward, respectively, by the pulling device provided to extend along the circumference of the lens sheet. Therefore, even if expansion and contraction or deformation of the lens sheet occurs due to secular variation or environmental changes, they are effectively absorbed so as to correct the lens sheet. As a result, the lens sheet is prevented from producing wrinkles or sag, which makes it possible to maintain the stable planar shape. In addition, according to the embodiment of the prevent invention, since the frame body is pressed against a portion, of the lens sheet, inside the pull portions, the planar shape of the lens sheet can be brought into a further stabler state. Thus, the embodiment of the present invention can surely prevent deterioration in image quality such as distortion of an image or the degradation of focus.

BRIEF DESCRIPTION OF THE DRAWINGS

FIG. 7 is an enlarged view of the "a" portion of FIG. 6;

FIGS. 8A, 8B and 8C are longitudinal cross-sectional side views illustrating the installation structure examples of the frame b.

DETAILED DESCRIPTION OF THE PREFERRED EMBODIMENTS

Preferred embodiments of the present invention will hereinafter be described in detail with reference to the drawings.

Figure 1:
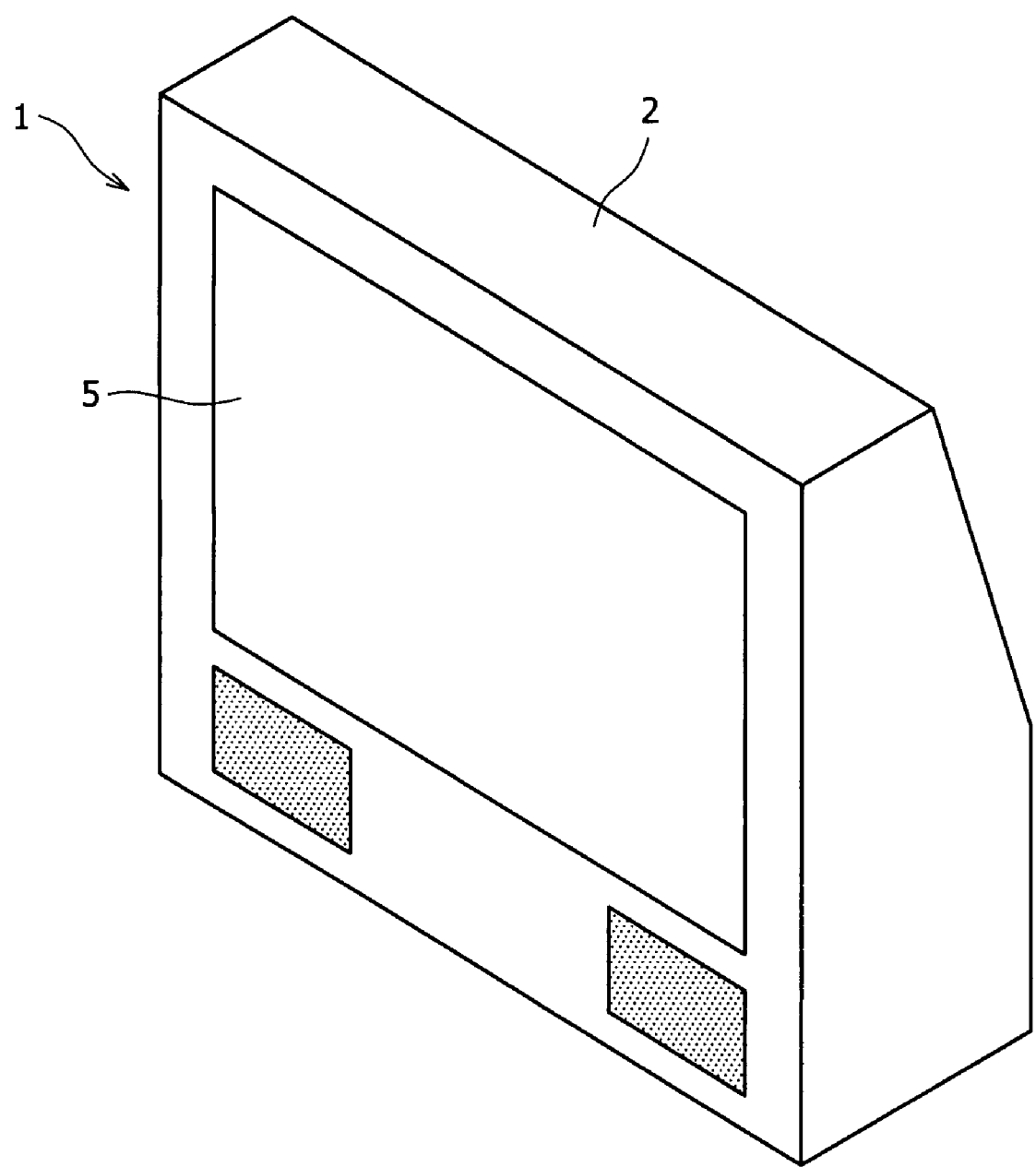
FIG. 1 is a perspective view illustrating the external appearance of a rear projection display apparatus embodying the present invention.
Figure 2:
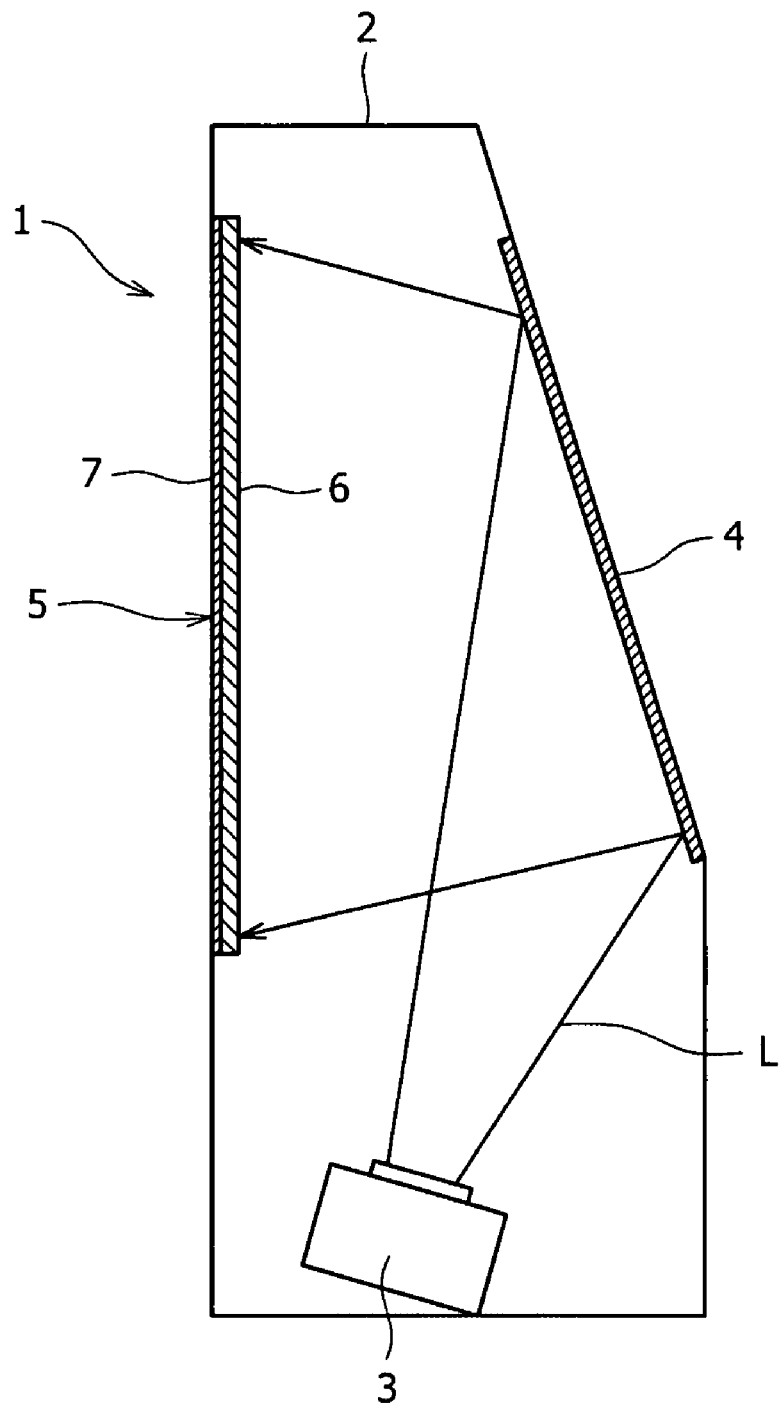
FIG. 2 is a side view illustrating the inner configuration of the apparatus.

FIG. 1 is a perspective view illustrating the external appearance of a rear projection display apparatus according to an embodiment of the invention. FIG. 2 is a side view illustrating the internal configuration of the apparatus.

As shown in FIG. 1, the rear projection display apparatus 1 includes a transmission type screen 5 disposed on the front face of an apparatus main body 2 and projects and displays video on the transmission type screen 5 from the rear side thereof. More specifically, as shown in FIG. 2, a video projector 3 is installed inside the apparatus main body 2. Video light L emitted from the video projector 3 is reflected by a reflection mirror 4 and then projected on the transmission type screen 5.

The transmission type screen 5 is configured such that a Fresnel lens plate 6 adapted to focus light and a lenticular lens sheet 7 adapted to uniformly distribute light to the entire screen are juxtaposed to each other. The Fresnel lens plate 6 includes a resin molding plate or glass plate serving as a substrate and a Fresnel lens sheet bonded to the substrate. On the other hand, the lenticular lens sheet 7 is installed in a state of a sheet, that is, without use of a substrate unlike the Fresnel lens plate 6. This achieves the thinning and weight-saving of the screen 5.

In this configuration, the lenticular lens sheet 7 needs to maintain a stable planar shape in order to ensure the excellent image display performance of the transmission type screen 5. To meet the need, the transmission type screen of the embodiment adopts the following configuration.

Figure 3:
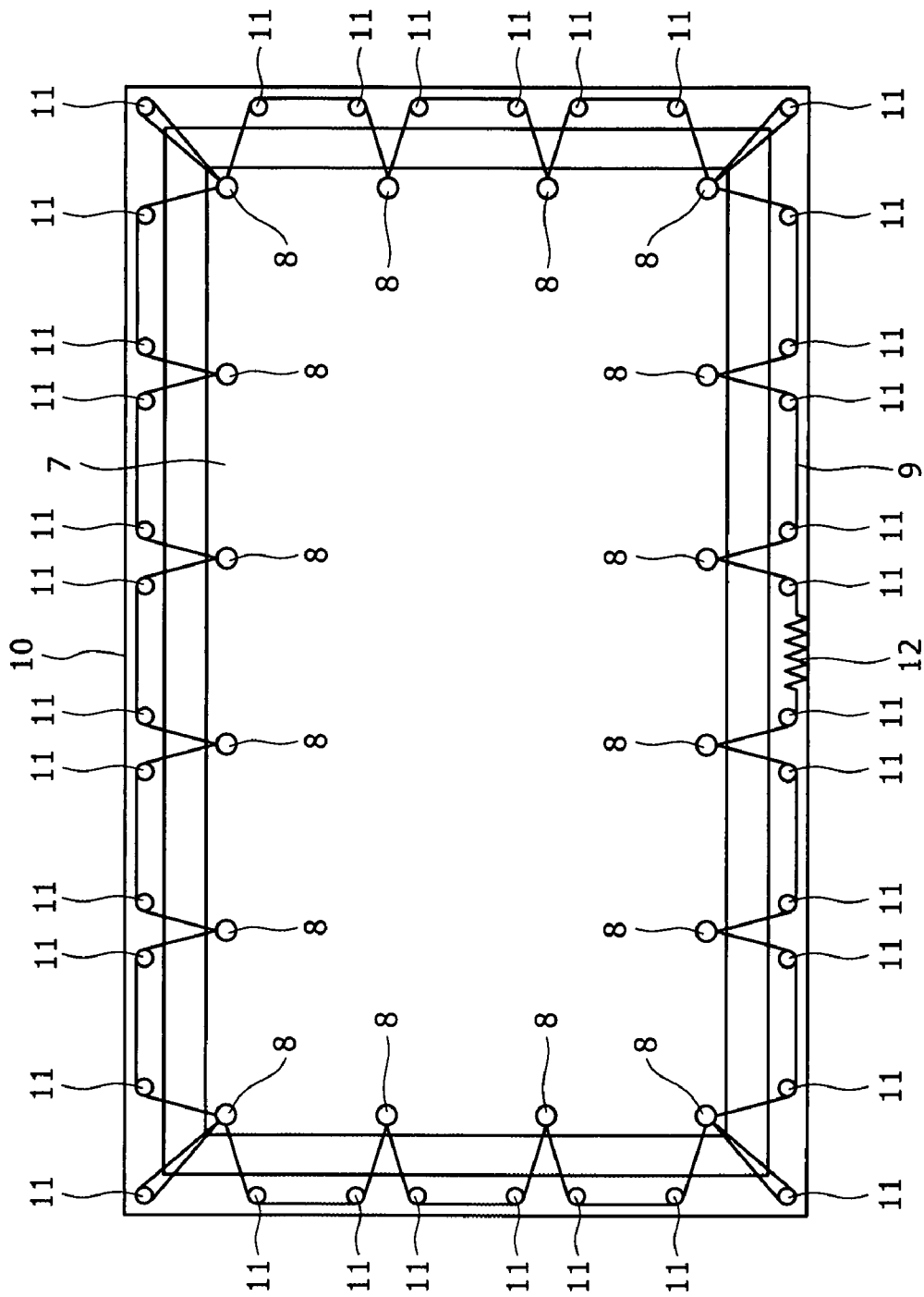
FIG. 3 is a plan view illustrating the attachment structure of a lenticular lens sheet in a transmission type screen.

FIG. 3 is a plan view of the lenticular lens sheet 7 as viewed from the front. The lenticular lens sheet 7 shown in the figure is a resin sheet formed in a horizontally long quadrangle. The lenticular lens sheet 7 is formed on its outer circumferential portion with a plurality of holes 8, serving as pull portions, approximately equally spaced from each other along upper and lower horizontal sides and left and right longitudinal sides. Incidentally, the substrate of the lenticular lens sheet 7 preferably uses a resin material such as PET, PC, PP, PS, or ABS as a material less susceptible to deformation or strain due to environmental changes.

In this configuration, a string 9 serving as a pulling device is provided to extend along the circumference of the lenticular lens sheet 7 so as to pass through the plurality of holes 8. In addition, the lenticular lens sheet 7 is attached to a frame 10 while being pulled upward and downward, and leftward and rightward by the string 9. The frame 10 is provided with a plurality of pins 11 which project therefrom and correspond to the holes 8 of the lenticular lens sheet 7. The lenticular lens sheet 7 is attached to the frame 10 in such a manner that the string 9 passing through the holes 8 is provided to extend along the entire circumference of the frame while being wound on the pins 11.

In this configuration, for instance, metal, resin or fabric is preferably used for the string 9. In this embodiment, a single piece of string 9 is provided to extend along the entire circumference of the frame 10. Incidentally, it is preferable that the string 9 be passed through the holes 8 so as to be oblique relative to the sides of the lenticular lens sheet 7 as shown in the figure so that the string 9 can be freely moved toward the sides of the lenticular lens sheet 7.

In this configuration, the string 9 is given tensile force by a spring 12, an elastic body, connected to an intermediate portion thereof. The plurality of holes 8 in the horizontal and longitudinal sides of the lenticular lens sheet 7 are pulled upward and downward, and leftward and rightward, respectively. Thus, the lenticular lens sheet 7 is attached to the frame 10 with its stable planar shape maintained.

The string 9 in the embodiment described above is given the tensile force applied to the lenticular lens sheet 7 by the spring 12, the elastic body. However, alternatively the lenticular lens sheet 7 can be configured to be pulled by the string 9 itself which is made elastic.

Figure 4:
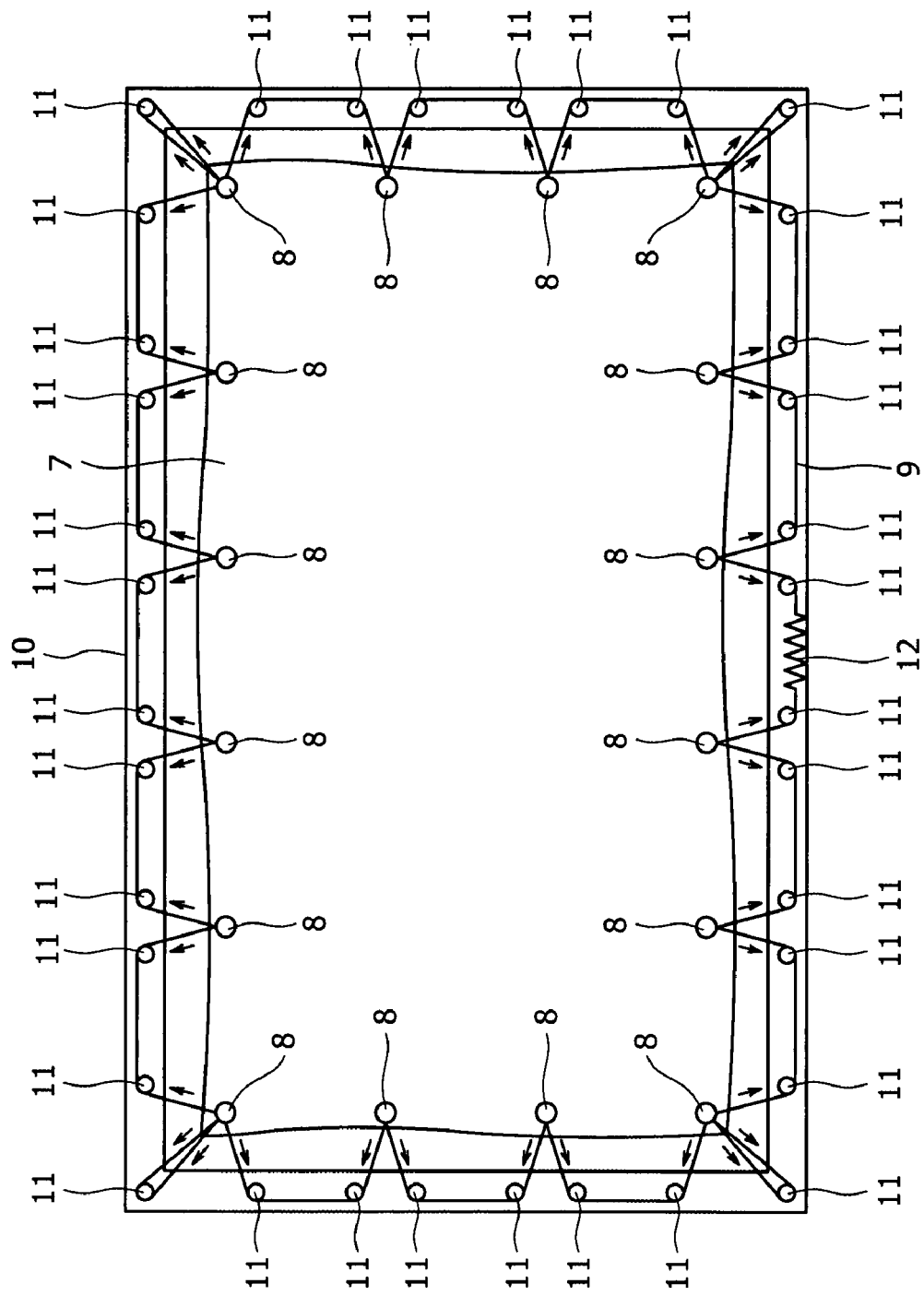
FIG. 4 illustrates the lenticular lens sheet producing expansion and contraction or deformation.

The transmission type screen described above is configured such that the plurality of holes 8 provided along the horizontal and longitudinal sides of the lenticular lens sheet 7 are pulled upward and downward, and leftward and rightward, respectively, by the string 9 provided to extend along the circumference of the lenticular lens sheet 7. Thus, even if occurring in the lenticular lens sheet 7 due to the secular variation or environmental changes, as shown in FIG. 4, expansion and contraction or deformation can be effectively absorbed so as to correct the lenticular lens sheet 7. Consequently, the lenticular lens sheet 7 can suppress the occurrence of wrinkles and sag, that is, maintain its stable planar shape.

Particularly in this configuration, the lenticular lens sheet 7 is pulled through a plurality of its points not through its sides and also can freely move in directions other than the directions of applying the tensile force. Even if occurring at the end of the lenticular lens sheet 7, expansion and contraction will not be prevented. Thus, the occurrence of wrinkles can be further effectively suppressed.

In this embodiment, since the lenticular lens sheet 7 is configured to be pulled by the single string 9, the whole of the lenticular lens sheet can be pulled by uniform force. More specifically, in this case, the tensile force of the string 9 is uniform at any portion unless friction occurs; therefore, the force applied to the lenticular lens sheet 7 is uniform at any point irrespective of a difference in displacement resulting from expansion and contraction. Even if the lenticular lens sheet 7 locally deforms, it can be pulled upward and downward, and leftward and rightward by uniform force. This makes it possible to maintain a stabler planar shape.

Figure 5:
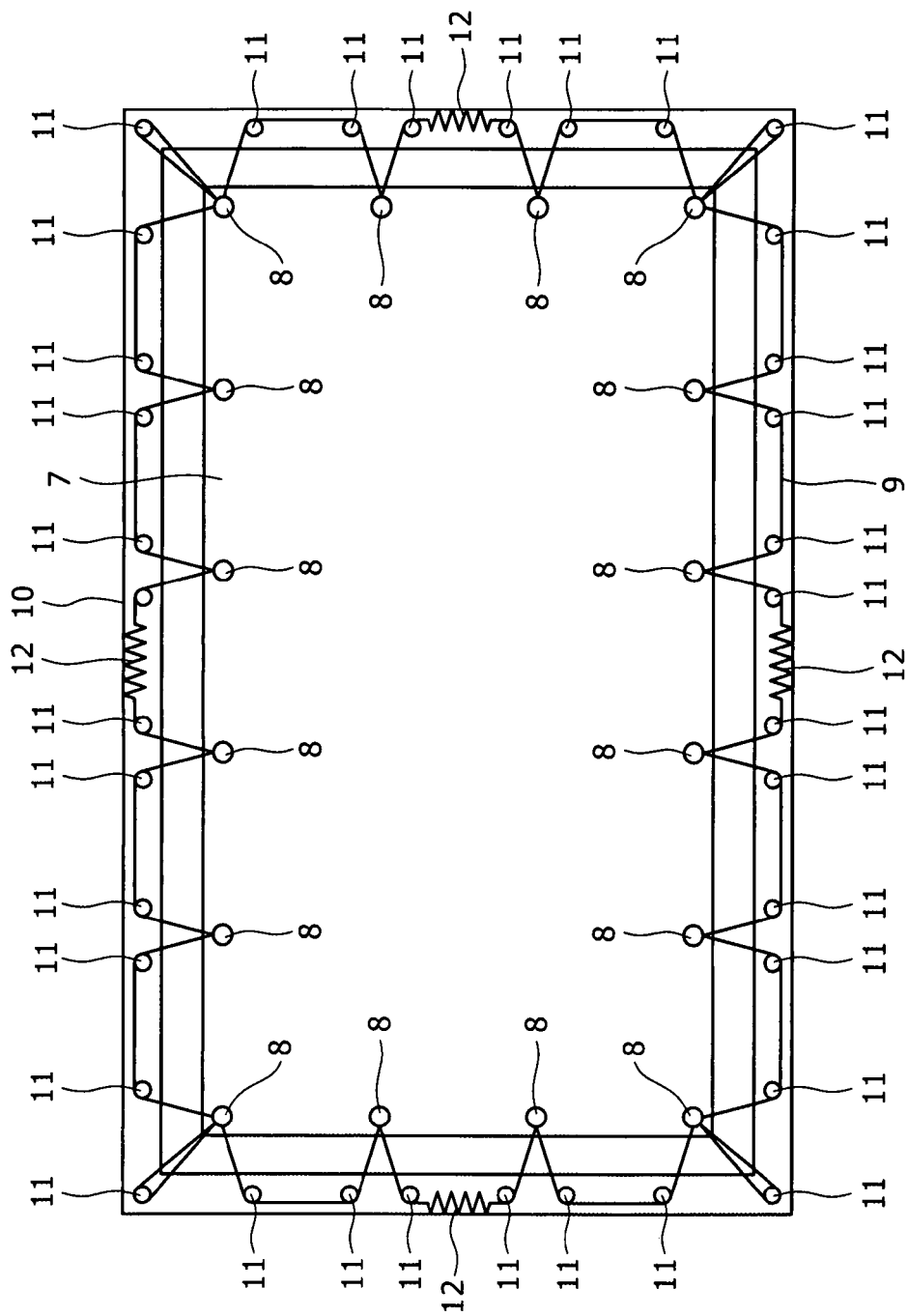
FIG. 5 illustrates the transmission type screen provided with a plurality of springs by way of example.

However, since friction occurs on the string 9 in practice, it is sometimes difficult to pull the lenticular lens sheet 7, depending on its size, with the single string. In this case, the string 9 may be divided into a plurality of sections. If the tensile force is insufficient, the springs 12 may be provided at a plurality of points as shown in FIG. 5.

The transmission type screen of the embodiment maintains the planar shape of the lenticular lens sheet 7 on the basis of the configuration described above. However, this configuration does not take full preparation for wrinkles. More specifically, the lenticular lens sheet 7 configured described above is pulled by the string 9, whereby distortion or stress concentration occurs around the holes 8. This may cause wrinkles extending from the holes 8 toward the inside of the lenticular sheet 7.

Figure 6:
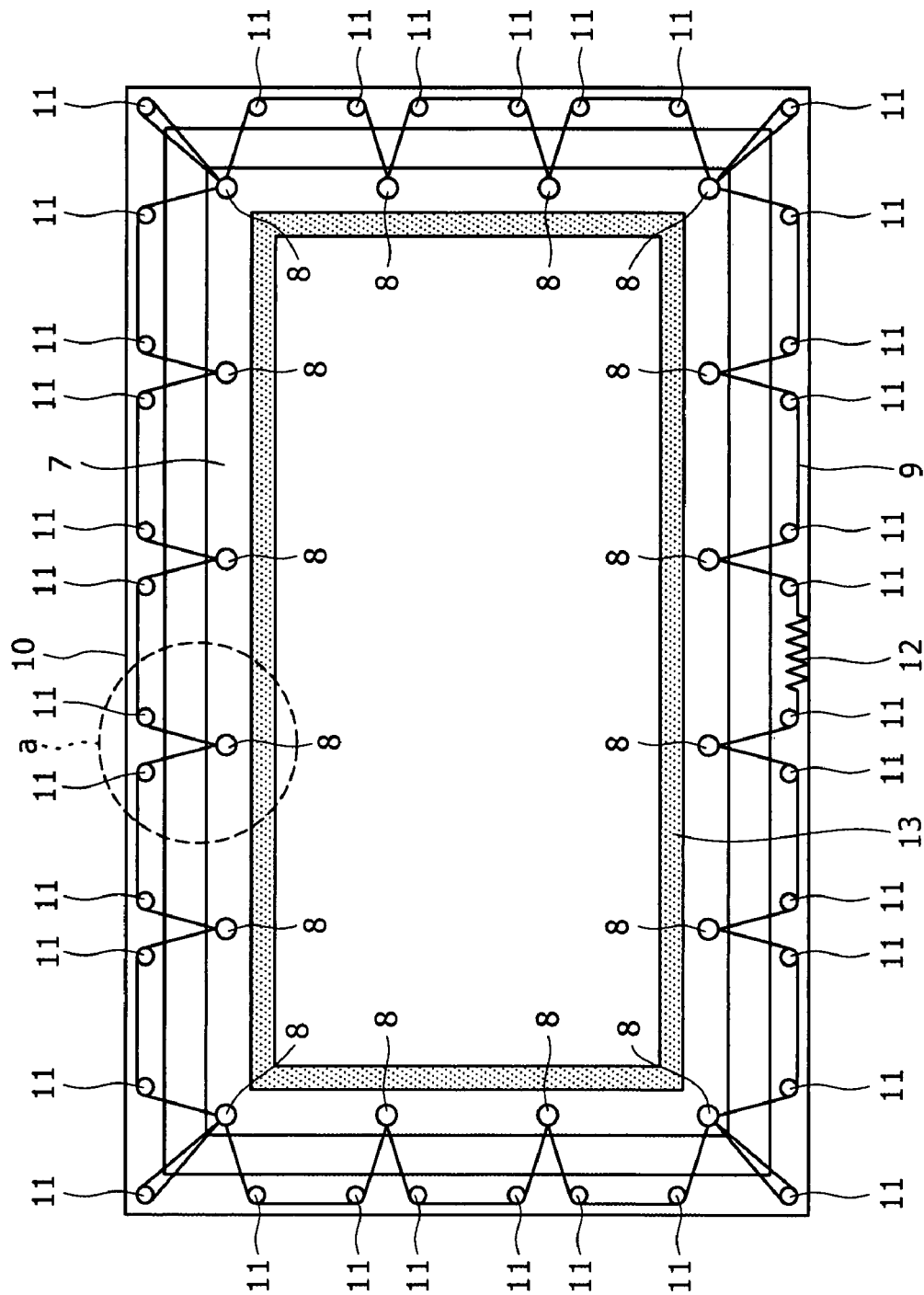
FIG. 6 illustrates a plan view illustrating the configuration in which a frame body is pressed against the lenticular lens sheet.

In the embodiment of the present invention, to suppress the effect of the wrinkles, as shown in FIG. 6, a frame body 13 is provided so as to be pressed against a portion, of the lenticular lens sheet 7, inside the holes 8. This frame body 13 is made of a cushion material such as sponge so as to be formed like a quadrangular frame plate. The frame body 13 is vertically pressed against the sheet surface, of the lenticular lens sheet 7, inside the holes 8.

As shown in FIG. 7, the lenticular lens sheet 7 against which the frame body 13 is pressed is pulled by the string 9 to possibly cause wrinkles 14 extending from around the hole 8 toward the inside. In this case, the wrinkles 14 are blocked by the frame body 13 so as to have no influence on the sheet surface inside the frame body 13.

In this way, the lenticular lens sheet 7 is configured such that the frame body 13 suppresses the influence of the wrinkles 14 extending from around the hole 8. Thus, the planar shape of the lenticular lens sheet 7 can be maintained in a further stable state.

FIGS. 8A, 8B and 8C illustrate the installation structure examples of the frame body. FIG. 8A illustrates an example in which the frame bodies 13 are installed to sandwich the lenticular lens sheet 7 from both sides thereof. FIG. 8B illustrates an example in which the frame body 13 is installed so as to be pressed against the rear surface of the lenticular lens sheet 7. FIG. 8C illustrates an example in which a plate 15 is disposed on the rear side of the lenticular lens sheet 7 and the frame body 13 is pressed against the front side of the lenticular lens sheet 7 so as to put the lenticular lens sheet 7 between the frame body 13 and the plate 15.

Figure 9:
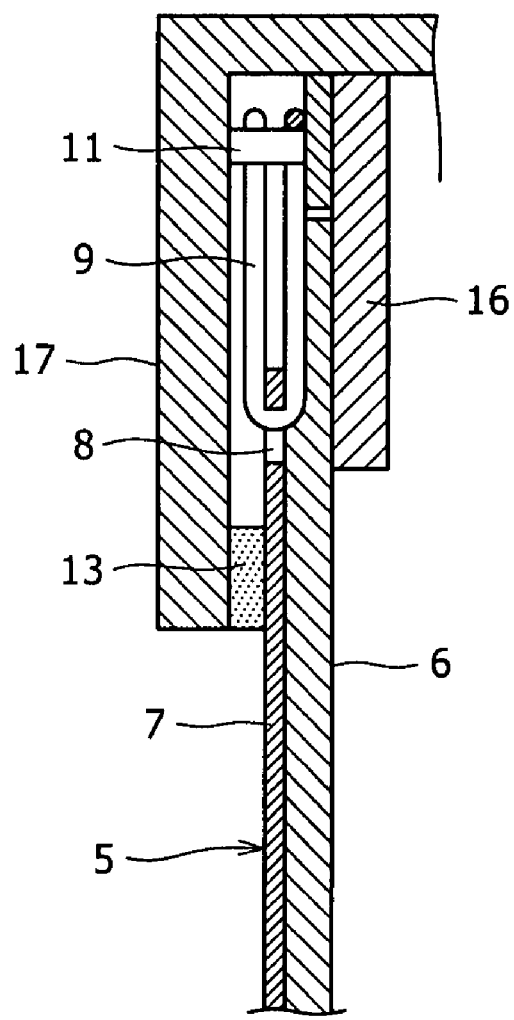
FIG. 9 is a longitudinal cross-sectional side view illustrating a chief portion of the transmission type screen according to the embodiment of the invention.

FIG. 9 illustrates an embodiment of a transmission type screen into which the above configuration is assembled. In the transmission type screen 5, a Fresnel lens plate 6 is disposed on the back of the lenticular lens sheet 7 which is attached while being pulled by the string 9, so as to be retained between the lenticular lens sheet 7 and the holder 16. In this configuration, the frame body 13 is attached to the back of a cover frame 17 covering the circumference of the transmission type screen 5. In addition, the frame body 13 is pressed against the sheet surface of the lenticular lens sheet 7 on the front side thereof while the lenticular lens sheet 7 is sandwiched between the frame body 13 and the Fresnel lens plate 6.

For example, a cushion material is used as the material of the frame body 13. The frame body 13 is compressed between the cover frame 17 and the lenticular lens sheet 7 to cause restoring force, which produces pressing force applied to the lenticular lens sheet 7. Incidentally, the pressing force of the frame body 13 is of a degree that does not prevent the expansion and contraction of the lenticular lens sheet 7. The frame body 13 is pressed against the lenticular lens sheet 7 in this way, thereby preventing the wrinkles from occurring around the hole 8.

The present inventors manufactured a transmission type screen configured as described above by way of trial, put it to the environmental test and observed the state of wrinkles of the lenticular lens sheet. Table 1 shows the results. The observation environments are as follows: a state where a temperature is 25° C. and a humidity is 60%; a state where a temperature is −10° C.; a wet state where temperature is returned from −10° C. to 25° C. so that water droplets adhere to the lenticular lens sheet; a state where a temperature is 40° C. and a humidity is 40%; a state at the time of the heat cycle (H/C) in which the operation of varying temperature between −20° C. and 60° C., taking 12 hours, is performed two cycles; a high-temperature and humidity state where a temperature is 40° C. and a humidity is 95%. As obvious from the results, the occurrence of wrinkles of the lenticular lens sheet was not identified even under the hostile environment and the satisfactory planar shape could be maintained.

TABLE 1

| | Observation Environment | | | | | |
|---|---|---|---|---|---|---|
| | 25° C. 60% | −10° C. | Wet | 40° C. 40% | H/C | 40° C. 95% |
| State of Wrinkles | Absence | Absence | Absence | Absence | Absence | Absence |

In the transmission type screen 5 configured described above, the expansion and contraction or deformation of the lenticular lens sheet 7 occurring due to secular variation or environmental changes are absorbed by a pull of the string 9 provided around the lenticular lens sheet 7. In addition, wrinkles occurring due to the pull of the string 9 are suppressed by the frame body 13. Thus, the planar shape of the lenticular lens sheet 7 can be reliably maintained. This can allow the rear projection display apparatus provided with the transmission type screen 5 to positively prevent deterioration in image quality such as distortion of an image or the degradation of focus.

Incidentally, the embodiment described above is configured such that the lenticular lens sheet 7 is pulled by the string 9. However, alternatively, the lenticular lens sheet 7 may be pulled by e.g. a spring. The plurality of pulling portions are not limited to the holes 8 and they may be configured as e.g. hooks or the like which retain a string or a spring.

The present invention can modify or alter the other portions in various ways without restriction of the embodiment described above.

What is claimed is:

1. A rear projection display apparatus, comprising:
   a main body;
   a transmission type screen on a front face of the main body;
   a video projector inside the main body for projecting a video image on the transmission type screen from a rear side thereof;
   a pulling device; and
   a frame body;
   wherein the transmission type screen includes a lens sheet with a plurality of pull portions provided along horizontal and longitudinal sides of the lens sheet, the pull portions being pulled up, down, left, and right, respectively, by the pulling device which extends along a circumference of the lens sheet, and
   wherein the frame body is pressed against a portion of the lens sheet inside the plurality of pull portions.

2. The rear projection display apparatus according to claim 1, wherein among the plurality of pull portions provided on the lens sheet, the pull portions provided at respective corner portions of the lens sheet are each pulled almost-diagonally and outwardly.

3. The rear projection display apparatus according to claim 1, wherein the pulling device is a string.

4. The rear projection display apparatus according to claim 3, wherein the plurality of pull portions are holes, and the lens sheet is pulled by the string which passes through the holes.

5. The rear projection display apparatus according to claim 4, wherein the string is passed through the holes obliquely relative to each of the sides of the lens sheet.

6. The rear projection display apparatus according to claim 3, wherein tensile force is applied to the lens sheet by an elastic body connected to the string.

7. A transmission type screen installed on a front face of a rear projection display apparatus, comprising:
   a lens sheet with a plurality of pull portions,
   wherein the plurality of pull portions are provided along horizontal and longitudinal sides of the lens sheet, the pull portions being pulled up, down, left, and right, respectively, by a pulling device which extends along a circumference of the lens sheet, and
   wherein a frame body is pressed against a portion of the lens sheet inside the plurality of pull portions.

8. The transmission type screen according to claim 7, wherein among the plurality of pull portions provided on the lens sheet, the pull portions provided at respective corner portions of the lens sheet are each pulled almost-diagonally and outwardly.

9. The transmission type screen according to claim 7, wherein the pulling device is a string.

10. The transmission type screen according to claim 9, wherein the plurality of pull portions are holes, and the lens sheet is pulled by the string which passes through the holes.

11. The transmission type screen according to claim 10, wherein the string is passed through the holes obliquely relative to each of the sides of the lens sheet.

12. The transmission type screen according to claim 9, wherein tensile force is applied to the lens sheet by an elastic body connected to the string.

* * * * *